(12) United States Patent
Kong et al.

(10) Patent No.: US 11,260,832 B2
(45) Date of Patent: Mar. 1, 2022

(54) SAFETY DEVICE FOR HEATING HOSES

(71) Applicants: Hyundai Motor Company, Seoul (KR); Kia Motors Corporation, Seoul (KR); NIFCO KOREA Inc., Chungcheongnam-do (KR); DY AUTO Corporation, Chungcheongnam-do (KR)

(72) Inventors: Nak Kyoung Kong, Gyeonggi-do (KR); Jong Min Park, Gyeonggi-do (KR); Doo Hyun Kim, Gyeonggi-do (KR); Ki Hong Lee, Seoul (KR); Seung Hyeok Chang, Gyeonggi-do (KR); Heung Hwan Lim, Chungcheongnam-do (KR); Jong Wook Lee, Chungcheongnam-do (KR); Jong Hyun Jin, Chungcheongnam-do (KR); Jae Hyoung Kim, Chungcheongnam-do (KR)

(73) Assignees: Hyundai Motor Company, Seoul (KR); Kia Motors Corporation, Seoul (KR); NIFCO KOREA Inc., Chungcheongnam-do (KR); DY AUTO Corporation, Chungcheongnam-do (KR)

( * ) Notice: Subject to any disclaimer, the term of this patent is extended or adjusted under 35 U.S.C. 154(b) by 324 days.

(21) Appl. No.: 16/432,293

(22) Filed: Jun. 5, 2019

(65) Prior Publication Data
US 2020/0180568 A1 Jun. 11, 2020

(30) Foreign Application Priority Data
Dec. 5, 2018 (KR) .......................... 10-2018-0155358

(51) Int. Cl.
*B60S 1/48* (2006.01)
*H05B 3/58* (2006.01)
*B62D 25/08* (2006.01)

(52) U.S. Cl.
CPC ................ *B60S 1/488* (2013.01); *H05B 3/58* (2013.01); *B62D 25/081* (2013.01)

(58) Field of Classification Search
CPC ........ B60S 1/488; B62D 25/081; F16L 53/38; H01H 37/043; H01H 37/52;
(Continued)

(56) References Cited

U.S. PATENT DOCUMENTS

| 2005/0086758 | A1* | 4/2005 | Arkashevski | ........... B60S 1/365 15/250.02 |
| 2007/0063071 | A1* | 3/2007 | Liang | ...................... B60S 1/488 239/284.1 |

(Continued)

FOREIGN PATENT DOCUMENTS

KR  10-2009-0052417 A  5/2009

*Primary Examiner* — Dana Ross
*Assistant Examiner* — Ket D Dang
(74) *Attorney, Agent, or Firm* — Mintz Levin Cohn Ferris Glovsky and Popeo, P.C.; Peter F. Corless

(57) ABSTRACT

A safety device for heating hoses is provided to prevent overheating of a heating wire. The safety device includes a first hose that connects between a reservoir and a connector and a second hose that is fluidly connected to the first hose and allows windshield washer fluid to flow from the connector to a spray nozzle. A housing encloses the connector and a heating wire is disposed in at least one of the first and second hoses. A terminal is disposed inside the housing and is connected to the heating wire to apply electric power from a power supply unit to the heating wire. A circuit breaker is (Continued)

connected to the terminal and the heating wire and cuts off electric power applied to the heating wire based on a temperature condition.

9 Claims, 3 Drawing Sheets

(58) Field of Classification Search
CPC ........ H05B 2203/016; H05B 2203/021; H05B 3/56; H05B 3/58; H05B 3/82
USPC .......... 219/510; 239/284.1, 284.2, 130, 131, 239/135, 139; 392/479, 480, 481, 485, 392/488, 489, 491, 492, 478; 251/6, 7, 251/250.05
See application file for complete search history.

(56) References Cited

U.S. PATENT DOCUMENTS

| | | | | |
|---|---|---|---|---|
| 2007/0284457 | A1* | 12/2007 | Shank | B05B 9/002 |
| | | | | 239/135 |
| 2015/0257205 | A1* | 9/2015 | Hase | H05B 3/20 |
| | | | | 219/539 |
| 2018/0215351 | A1* | 8/2018 | Bayard | B60S 1/488 |
| 2019/0031154 | A1* | 1/2019 | Bayard | F16L 53/38 |
| 2019/0375377 | A1* | 12/2019 | Bonne | B60S 1/3801 |

* cited by examiner

SAFETY DEVICE FOR HEATING HOSES

CROSS-REFERENCE(S) TO RELATED APPLICATION

This application claims under 35 U.S.C. § 119(a) the benefit of priority to Korean Patent Application No. 10-2018-0155358 filed on Dec. 5, 2018, the entire contents of which are incorporated herein by reference.

BACKGROUND

(a) Technical Field

The present disclosure relates to a safety device for heating hoses, and more particularly, to a safety device for heating hoses in which a connector, a terminal and a circuit breaker are integrally incorporated and the circuit breaker selectively contacts or releases from the terminal based on temperature of windshield washer fluid flowing through the connector to operate the safety device based on temperature of the windshield washer fluid.

(b) Background Art

A windshield glass of a vehicle generally includes a wiper(s) for securing driver's field of view. The wiper removes water and/or foreign substances present on the windshield glass through reciprocating movement, thereby securing the driver's field of view. A windshield washer fluid spraying apparatus is installed in a cowl top cover and a hood of the vehicle. In particular, windshield washer fluid contained in a windshield washer fluid reservoir tank disposed inside the hood is delivered to a pump and then sprayed from a nozzle onto the windshield glass.

However, in the developed windshield washer fluid spraying apparatus, the windshield washer fluid contained in the reservoir tank is cooled down and thus is unable to be sprayed onto the windshield glass in response to a user's request in severe cold temperatures. In recent years, to solve this problem, a technique has been developed in which a heating element is inserted into a hose through which windshield washer fluid flows to heat up the windshield washer fluid above a predetermined temperature.

However, the hose is broken down or malfunctions when overvoltage or over current is applied to the heating element configured to eliminate the state in which the windshield washer fluid is cooled down. In addition, although the windshield washer fluid above the predetermined temperature is measured, the heating element may often continue to be operated causing a problem due to vaporization of the windshield washer fluid. Therefore, there is a demand for a safety device for heating hoses that maintain the windshield washer fluid above a predetermined temperature in low temperature environment and prevent overheating of a unit for providing heat.

The above information disclosed in this section is merely for enhancement of understanding of the background of the disclosure and therefore it may contain information that does not form the prior art that is already known in this country to a person of ordinary skill in the art.

SUMMARY

The present disclosure provides a heating hose capable of being stopped when temperature of windshield washer fluid is sufficient. Another object of the present disclosure is to provide a safety device in which a hose, a connector, a terminal and a circuit breaker are integrally incorporated. Yet another object of the present disclosure is to provide a safety device for heating hoses that is capable of securing sufficient temperature of windshield washer fluid and preventing fire hazard caused by application of overvoltage in advance.

Objects of the present disclosure are not limited to the objects as mentioned above and other objects of the present disclosure, which are not mentioned herein, maybe understood by reading the following description and maybe more clearly understood by exemplary embodiments of the present disclosure. Further, the objects of the present disclosure may be realized by the means represented in the appended claims and combinations thereof.

In one aspect of the present disclosure, a safety device for heating hoses may include: a first hose that connects between a reservoir and a connector; a second hose fluidly connected to the first hose and allows windshield washer fluid to flow from the connector to a spray nozzle; a housing that encloses the connector; a heating wire disposed in at least one of the first and second hoses; a terminal disposed inside the housing and connected to the heating wire to apply electric power from a power supply unit to the heating wire; and a circuit breaker connected to the terminal and the heating wire and configured to cut off electric power applied to the heating wire based on a temperature condition.

Additionally, the safety device for heating hoses may include a tightening member disposed inside of the housing to force the heating wire and the circuit breaker to abut; and a sealing part disposed at a position where the housing and the connector face each other and configured to seal the inside of the housing.

In particular, a first end of the heating wire is disposed at a positive terminal of the terminal and a second end of the heating wire is connected to the circuit breaker. The circuit breaker may be connected to a negative terminal of the terminal. In addition, the heating wire may be reversed at a distal end of the hose and both ends of the heating wire may be positioned inside the connector.

Further, the circuit breaker may include a bimetal such that electric power is selectively applied between the terminal and the heating wire based on the temperature condition. When the temperature condition is less than a predetermined value, electricity conducting is generated between the terminal and the heating wire and when the temperature condition is greater than the predetermined value, electrical connection between the terminal and the heating wire is opened.

Additionally, a central portion of the heating wire may be made of at least one of a copper alloy and a nickel-chromium alloy and an outer portion surrounding the central portion may be made of a Teflon insulating material. The connector may be disposed in a cowl top cover. The temperature condition may include at least one of the temperature of the windshield washer fluid passing through the connector and the temperature of the outside air.

According to the present disclosure, the following effects may be achieved by combination and use relationship of the foregoing exemplary embodiments and configurations described below. The present disclosure may prevent the operation of the heating hose when the windshield washer fluid is at a sufficient temperature and thus, has an effect of enhancing durability of the heating hose. Further, the present disclosure may continuously and smoothly use the windshield washer fluid to be thawed safely during driving and thus, has an effect of providing clearer field of view to the driver.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
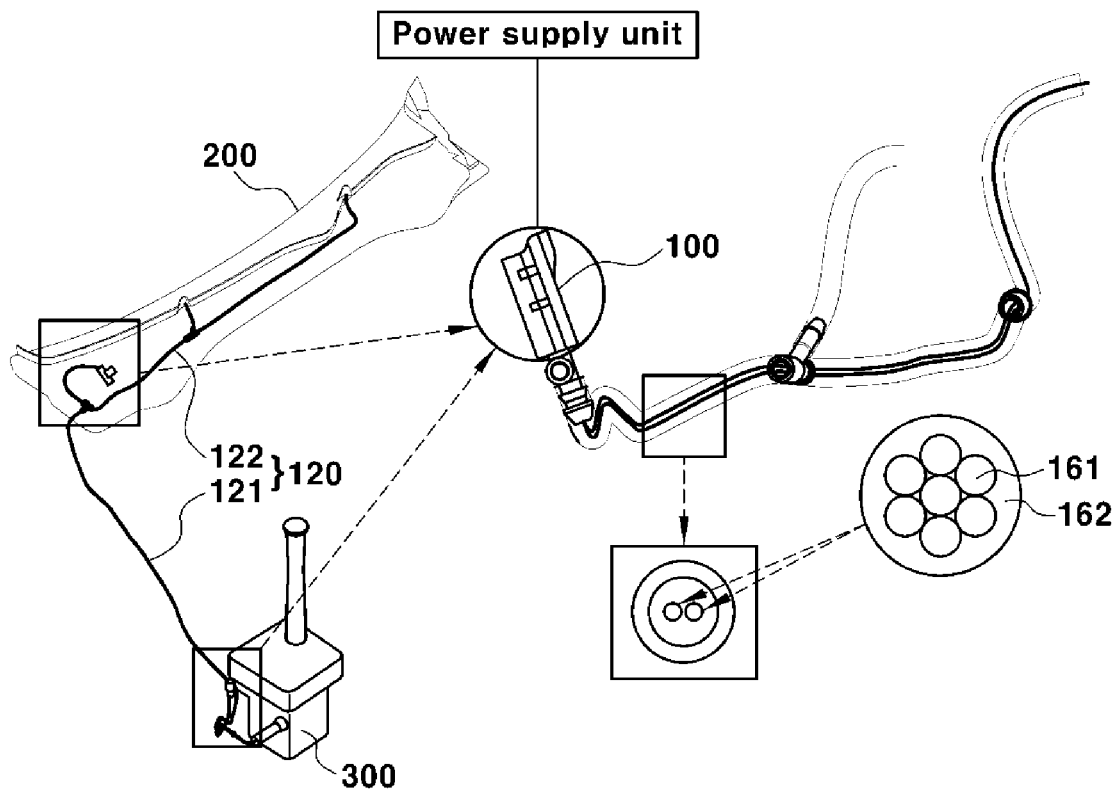
FIG. 1 illustrates a component diagram of a safety device for heating hoses according to an exemplary embodiment of the present disclosure.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described below in more detail with reference to the accompanying drawings. The exemplary embodiments of the present disclosure may be modified in various forms, and the scope of the present disclosure should not be construed as being limited to the following exemplary embodiments. This embodiment is provided to more fully describe the present disclosure to those skilled in the art.

In addition, the term "portion," "part," or the like as described herein means a unit for performing at least one function or operation and may be implemented by combining hardware, software, or hardware and software. Further, dividing names of certain components into "first ~," "second ~," etc. herein is intended to distinguish the components which are in the same relationship from each other, and the present disclosure is not necessarily limited to the order of those ordinal terms in the following description.

Figure 2:
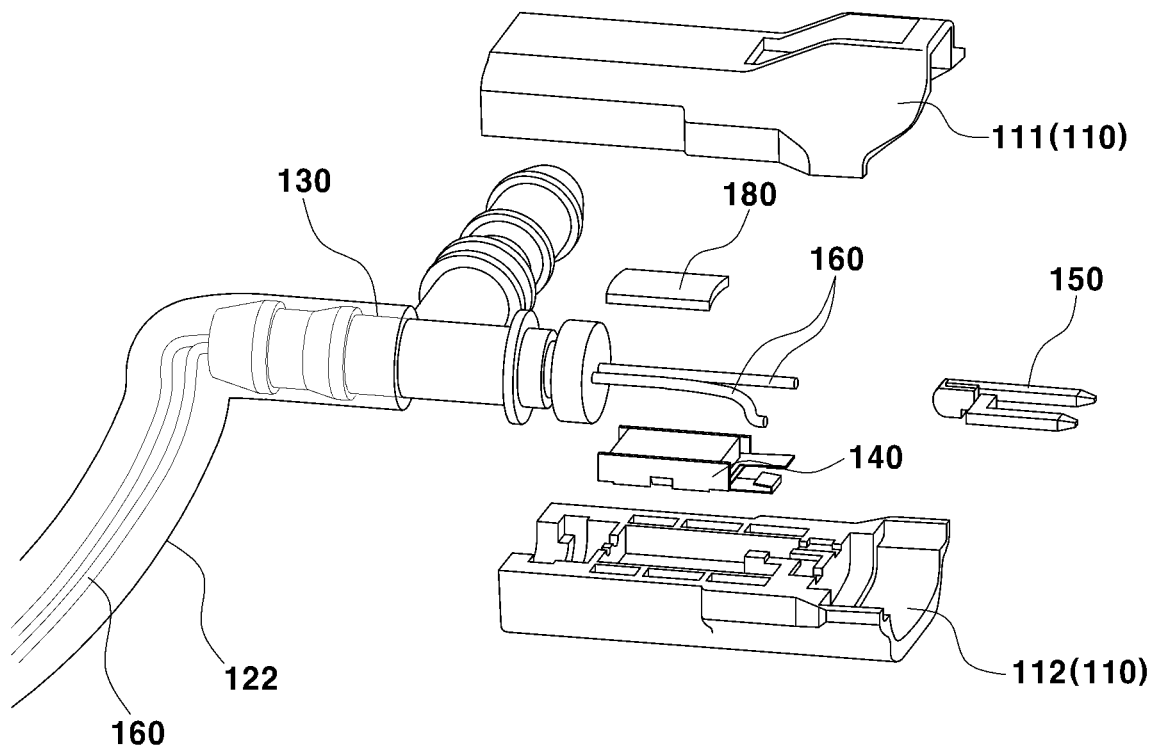
FIG. 2 illustrates coupling relationship of a connector of a safety device for heating hoses according to an exemplary embodiment of the present disclosure.

FIGS. 1 and 2 illustrate component diagrams of a safety device for heating hoses 100 according to the present disclosure, which show coupling relationship between a connector 130 connected to allow for flow of windshield washer fluid and components of a cowl top cover 200 in which the connector 130 is disposed. As shown in the figures, the safety device for heating hoses 100 of the present disclosure may be disposed on one side of the cowl top cover 200. In addition, the safety device for heating hoses 100 may be fluidly connected to a first hose 121 and a second hose 122 and thus, the windshield washer fluid within a windshield washer fluid reservoir 300 may be sprayed through a nozzle part.

The safety device 100 disposed in the cowl top cover 200 may include a first hose 121 fluidly connected to the windshield washer fluid reservoir 300 disposed inside a vehicle and to the connector 130, and a second hose 122 connected from the connector 130 to a windshield washer fluid nozzle part. At least a part of the connector 130 may be disposed inside the housing 110 and maybe fluidly connected through the first hose 121 and the second hose 122.

A heating wire 160 may be disposed in at least one of the first hose 121 and the second hose 122 and maybe electrified to the terminal 150 disposed inside the housing 110. In particular, a first end of the heating wire 160 may be connected to a positive terminal 151 of the terminal 150 and a second end of the heating wire 160 may be connected to a circuit breaker 140. In addition, the circuit breaker 140 may be connected to a negative terminal 152 of the terminal 150. Accordingly, the heating wire 160 may be electrified through the terminal 150 based on a certain condition.

The housing 110 of this exemplary embodiment of the present disclosure may include an upper housing 111 and a lower housing 112. In addition, the housing may be configured such that the connector 130 is connected to a first end of the housing 110 and a portion of the terminal 150 is positioned to a second end of the housing and electric power may be applied to the heating wire 160 connected to each hose 120 through the connector 130.

Further, the housing 110 may include a space portion (e.g., a void) at a portion where the circuit breaker 140 is disposed, and the circuit breaker 140, both ends of the heating wire 160 and the terminal 150 may be disposed within the space portion. In addition, the housing 110 may be fastened into a bore formed at a distal end of the cowl top cover 200. Accordingly, the housing 110 may be connected to the second hose 122 disposed below the cowl top cover 200 and the first hose 121 connected from the reservoir 300 respectively. The first hose 121 and the second hose 122 may be fluidly connected through the connector 130 disposed inside the housing 110.

The circuit breaker 140 of this exemplary embodiment of the present disclosure is composed of a bimetal having different expansion coefficients. The bimetal may be a bar shaped part formed by superimposing two types of thin metal plates having different expansion coefficients and forming the plates into one sheet to control instruments based on temperature, using a bending property thereof upon application of heat.

In other words, the bimetal may be formed by superimposing two types of thin metals having different thermal expansion coefficients, that is, different degrees of expansion and contraction based on the change in temperature. When the temperature increases, a portion having a higher thermal expansion coefficient further expands and thus curves to the opposite side. When the temperature drops again, it returns to an original state. An alloy of nickel (Ni) and iron (Fe) may be used as a less expandable metal whereas an alloy of nickel, manganese and iron, an alloy of nickel, molybdenum and iron, an alloy of nickel, manganese and copper and the like may be used as a well expandable metal.

The circuit breaker 140 according to this exemplary embodiment of the present disclosure may be formed by stacking metal plates having different expansion coefficients and the circuit breaker may be configured to selectively control electricity conducting between the heating wire 160 and the power supply unit 400 disposed in the vehicle based on temperature condition of the vehicle. Additionally, the circuit breaker 140 may be positioned to be electrified to the heating wire 160 and the power supply unit 400 at the initial stage and then the electrical connection may be opened based on at least one temperature condition of a temperature of the windshield washer fluid and a temperature of the outside air as driving environment of the vehicle.

In summary, the circuit breaker 140 may be disposed to allow for electricity conduction between the heating wire 160 and the power supply unit 400 in the initial stage and then, when the temperature condition of the vehicle is greater than a predetermined reference value, a first end of the metal constituting the circuit breaker 140 expands. Thus, the circuit is opened to prevent electric power from being applied to the heating wire 160. A central portion 161 of the heating wire 160 may be made of at least one of a copper alloy and a nickel-chromium alloy and an outer portion 162 of the heating wire 160 surrounding the central portion 161 may be made of a Teflon insulating material.

In this exemplary embodiment of the present disclosure, the temperature condition for performing operation of the heating wire 160 may be measured using a sensor (not shown) configured to measure temperature of the outside air of the vehicle or a sensor (not shown) configured to measure temperature of the windshield washer fluid. Further, it may be possible to define a temperature point where a circuit (circuit breaker 140) is opened based on physical properties of metal plates of the circuit breaker 140. The temperature point may be defined such that no electric power is supplied to the heating wire 160 above a temperature at which the metal plate expands.

Further, the heating wire 160, connected to the connector 130 at a first end of the heating wire 160, maybe disposed in at least one of the first hose 121 and the second hose 122. In addition, the heating wire 160 may be reversed at a distal end of the hose 120 and a second end of the heating wire 160 may be disposed in the connector 130. Therefore, the heating wire may be configured as a single assembly with both ends of the heating wire 160 disposed in the safety device 100 while a first end thereof is connected to the positive terminal 151 of the terminal 150 and a second end thereof is connected to the negative terminal 152 through the circuit breaker 140.

As described above, in this exemplary embodiment of the present disclosure, since the heating wire 160 may be extended in the longitudinal direction of the hose 120 and reversed at the distal end of the hose 120 and then introduced into the connector 130, the heating wire 160 may be provided as a single assembly in which both ends of the heating wire are positioned in the connector 130.

Figure 3:
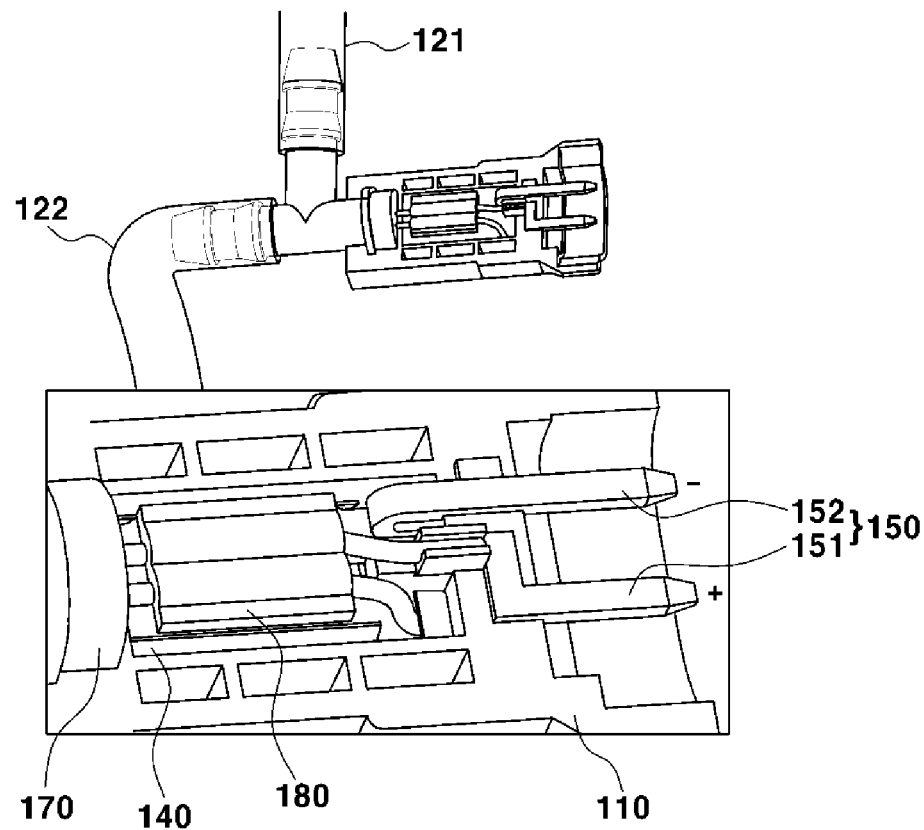
FIG. 3 illustrates coupling relationship in the inside of a housing of a safety device for heating hoses according to an exemplary embodiment of the present disclosure.

FIG. 3 shows a component diagram of the safety device 100 according to an exemplary embodiment of the present disclosure, in which coupling relationship between components of the connector 130, the terminal 150, the circuit breaker 140 and the housing 110 is illustrated. In particular, the safety device 100 of this exemplary embodiment of the present disclosure may include a T-shaped connector 130, a housing 110 configured to fix at least a part of the connector 130, a terminal 150 disposed inside of the housing 110 and adapted to supply electric power from the power supply unit 400 to the heating wire 160, and a circuit breaker 140 connected to one terminal (e.g., a first terminal) of the terminal 150 and connected to one end (e.g., a first end) of the heating wire 160.

Further, the safety device may include a space portion (e.g., a void) in the inside of the housing 110 and both ends of the heating wire 160 disposed along the hose 120, the circuit breaker 140 and the terminal 150 may be disposed in the space portion. Thus, electric power (voltage) applied from the power supply unit 400 through the inner space of the housing 110 may be electrified to the heating wire 160. In addition, a first end of the heating wire 160 may be directly connected to the positive terminal 151 of the terminal 150 and a second end of the heating wire 160 may be connected to the circuit breaker 140 directly connected to the negative terminal 152 of the terminal 150.

Further, this exemplary embodiment may include a sealing part 170 disposed at a position where the connector 130 and the housing 110 face each other and a tightening member 180 configured to force the terminal 150, the heating wire 160 and the circuit breaker 140 to closely cling together (e.g., to abut, be disposed in an abutting manner, be selectively connected, or the like). The sealing part 170 may be fixed to the T-shaped connector 130 by wire and may be constructed as a grommet performing waterproof function. Additionally, the sealing part 170 may include any configuration capable of preventing leakage of water from the connector 130 to the inside of the housing 110.

The tightening member 180 may be disposed inside the housing 110 and disposed at the top of the circuit breaker 140 to prevent any gap from being formed between components for conducting electricity. Further, the tightening member 180 may be configured in the form of a pad to conform to the coupling position of the circuit breaker 140 and the heating wire 160 and the terminal 150. The tightening member may be composed of a material having elastic property to thus receive a certain tension by the upper housing 111 and thus provides clinging force between the components to be coupled for conducting electricity.

Figure 4:
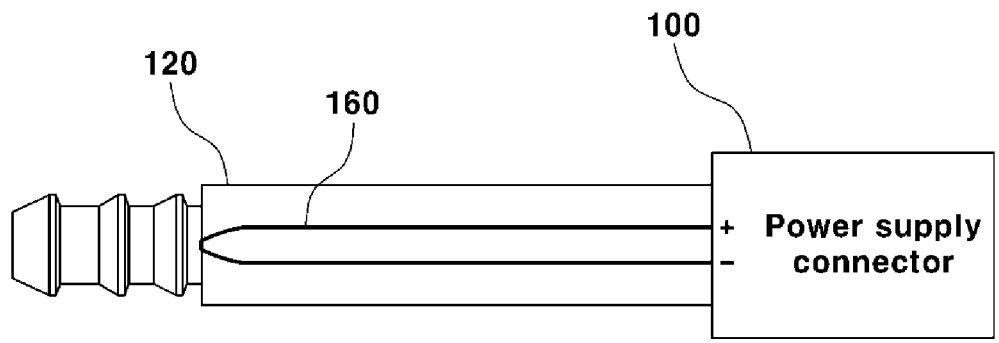
FIG. 4 illustrates a component diagram of a heating wire of a safety device for heating hoses according to an exemplary embodiment of the present disclosure.

FIG. 4 illustrates the coupling relationship of the first hose 121 or the second hose 122 connected to the connector 130 and the heating wire 160 in an exemplary embodiment of the present disclosure.

The heating wire 160 extending from the connector 130 may be disposed in at least one hose 120 of the first hose 121 and the second hose 122 and the heating wire 160 disposed along each hose 120 may be reversed at the distal end of the hose 120. Accordingly, a first end of the heating wire 160 may be positioned to be connected to a first terminal inside the housing 110 and a second end of the heating wire 160 may be introduced into the hose 120 and turned about 180 degrees at the distal end of the hose 120 and then connected to a second terminal inside the housing 110.

In particular, a first end of the heating wire 160 may be fastened to the positive terminal 151 of the terminal 150 and a second end of the heating wire 160 may be fastened to the circuit breaker 140 fastened to the negative terminal 152 of the terminal 150. Thus, both ends of one heating wire 160 disposed along the hose 120 may be disposed in the safety device 100 inside the connector 130.

Figure 5:
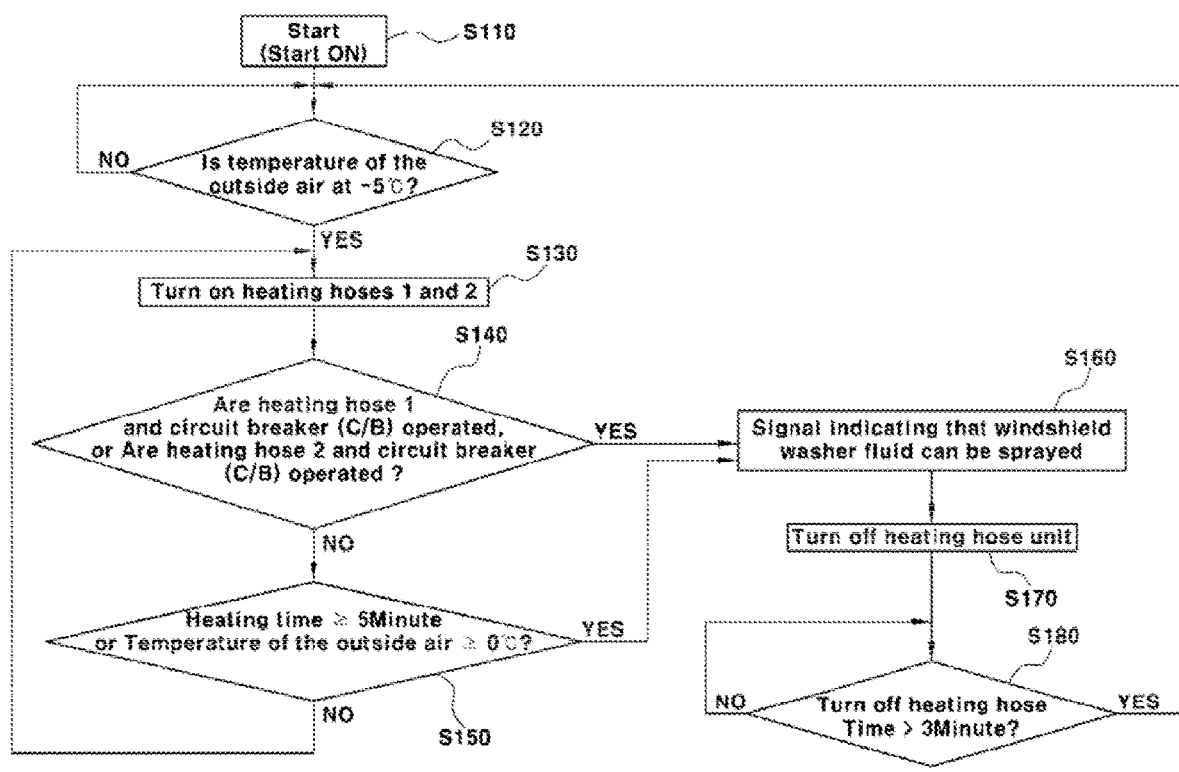
FIG. 5 illustrates a flow chart for performing operation of a safety device for heating hoses according to an exemplary embodiment of the present disclosure.

FIG. 5 illustrates a flow chart for performing operation of the safety device for heating hoses 100 according to an exemplary embodiment of the present disclosure. To perform operation of the safety device for heating hoses 100, temperature condition may be measured after the vehicle is started in step S110 and then whether the temperature condition is less than a predetermined temperature may be determined in step S120. In an exemplary embodiment of the present disclosure, whether the temperature of the outside air as a temperature condition is less than about −5° C. may be determined.

When the temperature condition of the vehicle is less than the predetermined temperature, electric power may be applied to the heating wire 160 disposed along the hose 120 in step S130 and thus, the windshield washer fluid flowing inside the hose 120 may be heated. When the temperature of the outside air or the windshield washer fluid flowing inside the safety device 100, which is the temperature condition of the vehicle, is greater than the predetermined temperature, whether the circuit breaker 140 connected to the heating wire 160 is operated may be determined in step S140. In response to determining that the circuit breaker 140 is operated, an alarm indicating that the windshield washer fluid maybe sprayed may be provided to a cluster of the vehicle in step S160. In other words, a notification may be provided to the vehicle driver indicating that the windshield washer fluid is capable of being sprayed.

After the alarm indicating that the windshield washer fluid maybe sprayed is output in step S160, a controller (not shown) disposed within the vehicle to operate the power supply unit may be configured to cutoff electric power applied to the heating wire 160 in step S170. Then, when a predetermined period of time has elapsed after electric power is cut off in step S180, the process may return to the initial step.

Further, in response to determining that the circuit breaker 140 is not operated, whether the heating time is greater than a predetermined time or the temperature of the outside air is greater than about 0° C. may be determined in step S150. When the heating time is greater than the predetermined time or the temperature of the outside air is greater than 0° C., the controller (not shown) may be configured to cut off electric power applied to the heating wire 160 in step S170 after the alarm indicating that the windshield washer fluid maybe sprayed is output in step S160. Afterwards, in response to determining in step S180 that a predetermining period of time (e.g., about 3 min about electric power is cut off) has elapsed after electric power is cut off, the process may return to the initial step.

As described above, the present disclosure is configured to selectively apply electric power to the heating wire based on the temperature condition, that is, temperature of the outside air of the vehicle or the windshield washer fluid flowing through the safety device 100 and thus, the safety device for heating hoses 100 may prevent vaporization or overheating of the windshield washer fluid.

The foregoing detailed description is intended to illustrate, by way of example, the present disclosure. Further, the foregoing description is intended to illustrate and explain exemplary embodiments of the present disclosure and the present disclosure may be utilized in various other combinations, changes and environments. That is, any changes or modifications maybe made within the scope of the spirit of the disclosure and disclosures disclosed in this specification, equivalents thereof and/or the technology or knowledge in the field of the art pertained to the present disclosure.

The embodiments described herein are intended to illustrate the best mode for carrying out the technical idea of the present disclosure and various modifications to be required in specific applications and uses of the present disclosure may also be made. Accordingly, the foregoing detailed description is not intended to limit the disclosure to the embodiments as disclosed herein. It is also to be understood that the appended claims are intended to cover such other exemplary embodiments.

What is claimed is:

1. A safety device for heating hoses, comprising:
   a first hose that connects between a reservoir and a connector;
   a second hose fluidly connected to the first hose and configured to allow windshield washer fluid to flow from the connector to a spray nozzle;
   a housing that encloses the connector;
   a heating wire disposed in at least one of the first and second hoses;
   a terminal located inside the housing and connected to the heating wire to apply electric power from a power supply unit to the heating wire;
   a circuit breaker connected to the terminal and the heating wire and configured to cut off electric power applied to the heating wire based on a temperature condition; and
   a tightening member disposed inside of the housing to force the heating wire and the circuit breaker to abut,
   wherein a first end of the heating wire is disposed at a positive terminal of the terminal and a second end of the heating wire is connected to the circuit breaker.

2. The safety device for heating hoses of claim 1, further comprising:
   a sealing part disposed at a position where the housing and the connector face each other and configured to seal the inside of the housing.

3. The safety device for heating hoses of claim 1, wherein the circuit breaker is connected to a negative terminal of the terminal.

4. The safety device for heating hoses of claim 1, wherein the heating wire is reversed at a distal end of the hose and both ends of the heating wire are disposed inside the connector.

5. The safety device for heating hoses of claim 1, wherein the circuit breaker includes a bimetal such that electric power is selectively applied between the terminal and the heating wire based on the temperature condition.

6. The safety device for heating hoses of claim 5, wherein when the temperature condition is less than a predetermined value, electricity conduction is generated between the terminal and the heating wire and when the temperature condition is greater than the predetermined value, electrical connection between the terminal and the heating wire is opened.

7. The safety device for heating hoses of claim 1, wherein a central portion of the heating wire is made of at least one of a copper alloy and a nickel-chromium alloy and an outer portion of the heating wire surrounding the central portion is made of a Teflon insulating material.

8. The safety device for heating hoses of claim 1, wherein the connector is disposed in a cowl top cover.

9. The safety device for heating hoses of claim 1, wherein the temperature condition includes at least one of a temperature of the windshield washer fluid passing through the connector and a temperature of outside air.

* * * * *